Jan. 3, 1928.
E. B. WILSON
1,655,119
PROTECTED THERMOMETRIC ELECTRIC CIRCUIT CLOSER
Filed Feb. 18, 1927
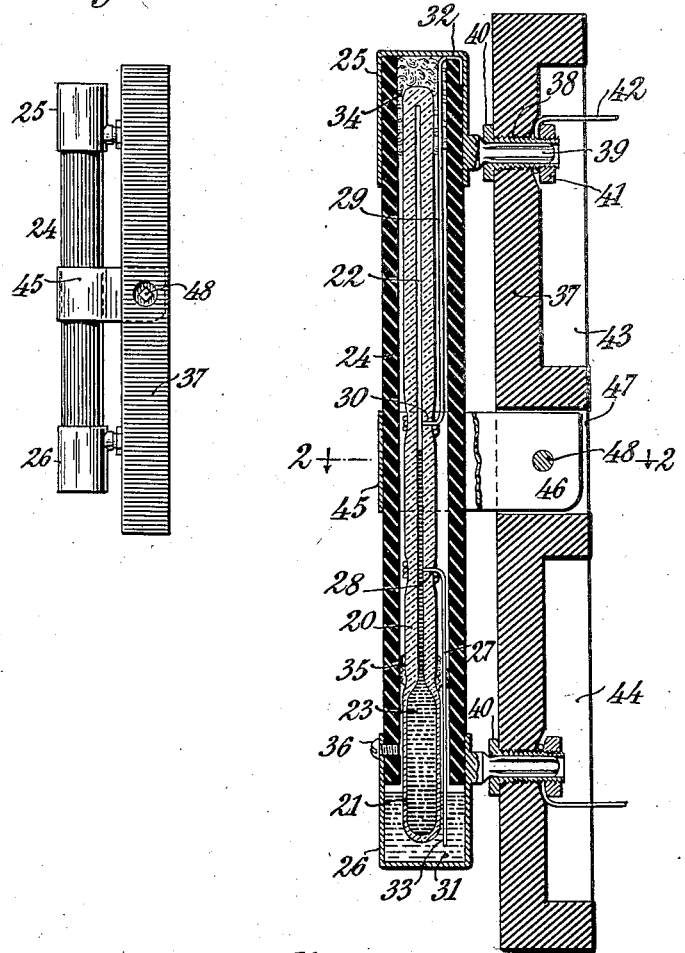
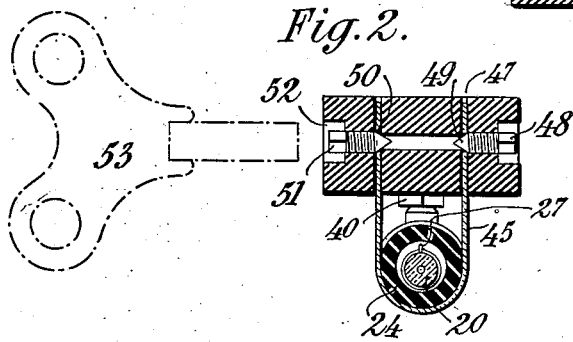
INVENTOR:
Elbert B. Wilson.
By Attorneys,
Fraser, Myers & Manley Patented Jan. 3, 1928.

1,655,119

UNITED STATES PATENT OFFICE.

ELBERT B. WILSON, OF EAST ORANGE, NEW JERSEY, ASSIGNOR TO GOLD CAR HEATING & LIGHTING COMPANY, OF BROOKLYN, NEW YORK, A CORPORATION OF NEW YORK.

PROTECTED THERMOMETRIC ELECTRIC-CIRCUIT CLOSER.

Application filed February 18, 1927. Serial No. 169,199.

This invention relates to an improved electric circuit closer of the well-known thermometric type adapted to close and open a circuit at a predetermined temperature.

It is an object of the invention to provide a simple but effective housing or protector for the circuit-closing element, which may be quickly disassembled for purposes of renewal and repairs, and which may include a positive and reliable means of quickly communicating changes of temperature from the exterior of the enclosure to the active element of the circuit closer.

In the accompanying drawings illustrating the preferred form of the invention:—

Figure 1 is a vertical cross-sectional view of a circuit closer embodying the invention;

Fig. 2 is a horizontal cross-sectional view of the same, a key whereby the fastening elements may be operated being illustrated in broken lines; and Fig. 3 is a side view of the device illustrated in Figs. 1 and 2.

In the form herein disclosed, the invention comprises a thermometer 20 having the usual bulb 21 and capillary tube 22 enclosing an appropriate amount of conductive expansible material 23, such, for example, as mercury.

The thermometer 20 may be mounted within a protecting element herein disclosed as a tube 24 of any suitable insulating material, the open ends of which may be closed by caps 25, 26, of metal or other electrically conductive material.

An electrical conductor 27 has a terminal 28 at one end in the form of a leading-in wire piercing the wall of the thermometer, said terminal being so positioned as to be brought into contact with the mercury at a temperature below that at which the circuit is to be closed.

A second electrical conductor 29 may be provided with an electric terminal 30 comprising a leading-in wire passing through the wall of the capillary tube, said terminal being positioned at the level to which the mercury will be expanded at the temperature at which the circuit is to be closed. At and above such temperatures the mercury of the thermometer will form a conductor connecting the terminals 28, 30.

In order that the housing or protector within which the thermometer in enclosed may not render the thermometer unduly sluggish in its response to variations of temperature without the circuit closer, means may be provided whereby changes of temperature may be readily communicated from the cap 26 to the thermometer bulb 21. To this end the cap 26 may be constructed of suitable material, such, for example, as nickel-plated copper, which will adapt it to serve as a well for a bath of mercury 31 or other appropriate heat-conductive material whereby the desired transfer of heat energy may be readily effected.

The electric conductors 27, 29 may be electrically connected with the caps 25, 26 in any suitable manner. As herein disclosed, the conductor 29 may be turned over the top of the tube 24 as at 32 and firmly clamped between the cap and the tube, thereby forming the desired electrical connection and an anchor for the end of the conductor which may serve as a suspension for the thermometer.

The conductor 27 may have its end turned downwardly and immersed in the bath of mercury 31, as indicated at 33.

In assembling the parts of the protector about the thermometer, its ends may be separated from the inner surfaces of the tube 24 by means of packing of cotton or other appropriate soft material, as indicated at 34, 35.

Either or both of the caps may be secured to the tube 24 by screws or other suitable fastening devices 36, although, as will hereinafter be explained, the use of such fastening devices is not necessarily essential.

The protected circuit-closer, hereinbefore described, may be mounted upon a baseplate or wall-plate 37 of any appropriate insulating material, by means of a pair of electric connectors or couplings each of which, in the form of the invention herein disclosed, comprises a socket 38 mounted in the base-plate and a resilient stud 39, the two studs being connected respectively to the caps 25, 26.

Each of the sockets 38 may comprise a sleeve threaded into the base-plate, having a flange or head 40 on the face of the plate, and a binding nut 41 on the rear or backside of the plate by which a connecting wire 42 may be conductively secured to the terminal. Preferably the base-plate will be recessed in the vicinity of the couplings as at 43, 44, to provide space for connecting wires.

The housed circuit breaker may be firmly secured to the base by means of a fastening element, such, for example, as the band 45 of metal or other appropriate material, passed over the tube 24 and having its ends 46 inserted in slots 47 in the base. The ends of the band may be securely but detachably held in place by means of set screws or other appropriate fastening devices 48 threaded in the base, having ends 49 which, when inserted, may enter openings 50 in the ends of the band. These fastening devices may have heads 51 normally positioned in recesses 52 in the sides of the base, providing space whereby a key 53 (Fig. 2) may be applied to the heads 51 and rotated in one direction to withdraw the fastening elements when the device is to be disassembled, and in the opposite direction to reinsert the fastening devices after the device has been reassembled.

It will be apparent that the parts of the above-described protected circuit closer may be readily disassembled by merely withdrawing the set screws 48, removing the band 45, detaching the elements of the connectors 38, 39, and separating the caps 25, 26 from the tube 24, after which the thermometer may be withdrawn. They may be as readily reassembled by inserting the thermometer within the tube, slipping the caps over its ends, thrusting the resilient studs 39 into the sockets 38, and applying the band 45, which may be secured in place as a result of a couple of turns of the set screws 48 by the key 53.

When in its assembled relation the electric couplings 38, 39 prevent endwise movement of the caps 25, 26 with respect to the tube 24, wherefore the use of a fastening element 36 between either cap and the tube is optional. The use of a fastening element between the lower cap and the tube, however, is recommended since it avoids the unintentional separation of the lower cap from the tube on separating the electric couplings 38, 39, which might result in the accidental spilling of the mercury 31 from the cap 26.

The above-described circuit closer presents a neat and attractive appearance, is relatively simple and inexpensive, is in the form which may not readily be tampered with by curious persons, and yet may be quickly disassembled for purposes of renewal and repair. The thermometer is well protected, yet provision is made whereby changes of temperature may be quickly communicated from the outside of the enclosure to the thermometer bulb.

The invention is not intended to be limited to the specific form herein disclosed for purposes of illustration, but may include modifications and variations thereof within the scope of the appended claims.

What I claim is:

1. The combination with an electric circuit closer, of an open-ended housing therefor of insulating material, caps of electrically conductive material to close the ends of said housing and to which the terminals of said circuit closer may be electrically connected, a base of insulating material, and a pair of separable electric couplings each comprising a terminal secured to said base and a terminal secured to one of said caps, said couplings when connected serving as a means preventing the withdrawal of said caps from the ends of said housing.

2. A housed circuit closer, as defined by claim 1, having a circuit closing element of the thermo-metric type with its bulb extended into one of the conductive caps, the device being adapted to be mounted in a vertical position with the cap into which the bulb extends lowermost so as to be adapted to serve as a well, and a bath of mercury in said well into which a part of said bulb is submerged, said mercury serving as a medium whereby changes of temperature may be communicated from said well to said bulb.

3. A housed circuit closer, as defined by claim 1, of which each pair of terminals forming the couplings between the housing caps and the base comprises a socket mounted in the base and a resilient stud on one of the caps adapted to be inserted and held in frictional engagement with its respective socket.

4. A housed circuit closer, as defined by claim 1, of which the terminals of the couplings which are secured to the base pass through the same and have binding screws at the back thereof, the back of the base being recessed in the vicinity of said binding screws to provide space for connecting wires.

5. The combination with an electric circuit closer, of an open-ended housing therefor of insulating material, caps of electrically conductive material to close the ends of said housing and to which the terminals of said circuit closer may be electrically connected, a base of insulating material, a pair of separable electric couplings each comprising a terminal secured to said base and a terminal secured to one of said caps, said couplings when connected serving as a means preventing the withdrawal of said caps from the ends of said housing, and a fastening element securing said housing to said base and preventing movement of said housing and caps in a direction upon which the separation of said couplings is dependent, thereby securing all parts of the housed circuit closer in assembled relation.

6. A housed circuit closer, as defined by claim 5, of which the fastening between the housing and the base comprises a band overlying the housing and having its ends detachably secured in slotted portions of the base by readily removable fastening elements.

In witness whereof, I have hereunto signed my name.

ELBERT B. WILSON.